US008712859B2

(12) United States Patent
Musrif

(10) Patent No.: US 8,712,859 B2
(45) Date of Patent: Apr. 29, 2014

(54) CONFIGURATION AND INCENTIVE IN EVENT MANAGEMENT ENVIRONMENT PROVIDING AN AUTOMATED SEGMENTATION OF CONSIDERATION

(75) Inventor: Balagangadhar Musrif, Sunnyvale, CA (US)

(73) Assignee: Eventbee, Inc., Sunnyvale, CA (US)

( * ) Notice: Subject to any disclaimer, the term of this patent is extended or adjusted under 35 U.S.C. 154(b) by 342 days.

(21) Appl. No.: 13/006,704

(22) Filed: Jan. 14, 2011

(65) Prior Publication Data
US 2012/0016697 A1   Jan. 19, 2012

Related U.S. Application Data

(60) Provisional application No. 61/295,680, filed on Jan. 15, 2010.

(51) Int. Cl.
*G06Q 99/00* (2006.01)
(52) U.S. Cl.
USPC ............................ 705/26.1; 705/26.35; 705/5
(58) Field of Classification Search
USPC .......................................... 705/26.1, 26.35, 5
See application file for complete search history.

(56) References Cited

U.S. PATENT DOCUMENTS

| 8,315,918 | B1 * | 11/2012 | Karonis et al. ............... 705/26.3 |
| 2008/0103878 | A1 * | 5/2008 | Leach et al. .................... 705/10 |
| 2011/0099037 | A1 * | 4/2011 | Levin et al. ....................... 705/5 |
| 2012/0136990 | A1 * | 5/2012 | Denker et al. ................ 709/224 |

FOREIGN PATENT DOCUMENTS

JP        62231529 A   * 10/1987

* cited by examiner

*Primary Examiner* — Akiba Allen
(74) *Attorney, Agent, or Firm* — Raj Abhyanker, P.C.

(57) ABSTRACT

This disclosure relates to configuration and incentive management in an event management environment providing an automated segmentation of consideration. The method may include incentivizing a set of users to promote a reservation of a ticket associated with an event on a event management server. The method may also include publishing a set of details associated with the ticket on the event management server, and generating a reselling agreement promising a consideration between a first user who may be a seller of the ticket, and a second user who may be a promoter of the event. The method may further include automatically generating a split of a ticket price purchased through a third user to the second user and the first user based on a set of agreed terms of the reselling agreement.

12 Claims, 7 Drawing Sheets

CONFIGURATION AND INCENTIVE IN EVENT MANAGEMENT ENVIRONMENT PROVIDING AN AUTOMATED SEGMENTATION OF CONSIDERATION

CLAIM OF PRIORITY

This application claims priority from U.S. provisional application No. 61/295,680 titled "CONFIGURATION AND INCENTIVE IN EVENT MANAGEMENT ENVIRONMENT PROVIDING AN AUTOMATED SEGMENTATION OF CONSIDERATION" filed on Jan. 15, 2010.

FIELD OF TECHNOLOGY

This disclosure relates to configuration and incentive management in an event management environment providing an automated segmentation of consideration.

BACKGROUND

An organizer of an event (e.g. a seller of a ticket associated with an event, a merchant, a retailer, a show organizer, a hotel hosting an event, a private party hosting an event etc.) may want to advertise a sale of a ticket associated with the event (e.g. a party, a fundraiser, a charity, a concert, a conference, a get-together, a hotel event, a restaurant opening etc.). The organizer of the event may want to promote the event widely to a large number of attendees. The organizer may not be aware of a demographic of a certain location, and may be unable to sell out the entire event without advertising and/or promoting the event adequately. The organizer may not be able to easily reach the right audience that may not be interested in the event. The organizer may not be able to adequately promote the event using conventional means such as creating posters advertising the event, posting details associated with the event on a website and/or mailing a set of contacts details about the event. The organizer may be crippled by these conventional methods and may not be able to adequately find a market for the event. The organizer of the event may also have to spend a large amount of time and money in trying to promote the event using such conventional methods. In doing so, the organizer may lose valuable time and money in promoting the event in addition to not finding the right audience for the event.

SUMMARY

This disclosure relates to methods and a system of configuration and incentive management in an event management environment providing an automated segmentation of consideration.

In one aspect, the method includes processing, through an event management server, a request of a first user to publish a set of reselling options associated with a ticket. The method also includes approving, through the event management server, a request of a second user to promote a reservation of the ticket associated with an event. Further, the method includes generating, through the event management server, a second user identification information. The method further includes placing the second user identification information on an availability notification of the ticket. The method may also include publishing the availability notification of the ticket on at least one social network profile associated with the second user. The method also includes reserving the ticket when a third user responding to the availability notification provides payment to a payment portal through the event management server. The method includes automatically generating, through the payment portal, a consideration to the second user when the payment is complete based on a reselling agreement between the first user and the second user communicated through the event management server. The method further includes automatically determining an availability of a remainder of tickets based on a number of reserved tickets.

The method also includes configuring a set of reselling options associated with the ticket through the event management server based on a response of a first user. The method may also include allocating at least one of a service charge and a hosting percentage of the ticket price to an entity controlling the event management server. The method may further include allocating the consideration to be generated to the second user when a purchase is complete.

The set of reselling option may be one of a number of tickets, the consideration allocated to the second user, a restriction on a number of tickets to be sold by the second user, a restriction on a number of tickets to be sold by the second user, a restriction on a time allotted to the second user for the sale of the tickets, a conditional consideration based on the number of tickets sold by the second user, a conditional consideration based on a period of time in which the second user sells a number of tickets and a sliding scale model of how a number of tickets sold by the second user in a given period of time.

The consideration to be generated may be a affiliate percentage of the ticket price, a sliding scale affiliate percentage based on the ticket price and the number of tickets reserved, and a fixed amount based on the number of tickets reserved.

The method may further include authorizing the second user to access the event management server. The method also includes selecting, through the second user, at least one reselling option associated with the ticket. Further, the method includes generating a reselling agreement between the first user and the second user based on the set of reselling options. The method further includes submitting, through the second user, an approval request of the reselling agreement to the first user.

The method may also include approving, through the first user. The first user may approve the reselling agreement through at least one of a manual approval of the first user and an automatic approval of the first user.

The manual approval may be based on at least one of an interest criteria of the second user, a prior history criteria of the second user, a ratings criteria of the second user, a reputation score criteria of the second user, a temporal criteria of the second user, a seasonal criteria of the second user and a geographical criteria of the second user.

The method may further include generating the second user identification information associated with the reselling agreement on the availability notification of the ticket when the first user approves the second user. The second user identification information may be at least one of a unique URL, a unique web source, a redemption code and a unique bar code.

The method further includes tracing a purchase of the ticket to the second user identification information. The method also includes automatically generating, through the payment portal, the consideration to the second user when the third user purchases the ticket.

The method also includes re-allocating, based on a response of the second user, a fraction of the consideration to the third user in the form of a discount offered on the ticket price. The method also includes automatically reducing the ticket price based on the discount. The method further includes generating a balance of the consideration to the second user based on the discount.

The method also includes updating, based on a response of the first user, the set of reselling options based on a current state of ticket reservations. The method may also include approving, based on the response of the first user, a set of future reselling agreements based on the current state of ticket reservations.

The method may also include dynamically modifying the consideration based on at least one a number of tickets sold through the second user and a number of tickets sold through the second user within a fixed period of time.

In another aspect, a system comprising a processor communicatively coupled with a volatile memory and a non-volatile storage includes an event management server and a payment portal. The event management server processes a request of a first user to publish a set of reservation details associated with a ticket. The event management server also approves a request of a second user to promote a reservation of the ticket. The event management server also generates a second user identification information to an availability notification of the ticket. The event management server also reserves the ticket when a third user responding to the availability notification provides payment to the payment portal. The payment portal automatically generates a consideration to the second user when the payment is complete based on a reselling agreement between the first user and the second user.

The event management server may automatically determine an availability of a remainder of tickets based on a number of reserved tickets.

The event management server may also configure a set of reselling options associated with the ticket and may allocate the consideration to be generated to the second user based on a response of the first user.

The payment portal may automatically reduce the ticket price of the ticket when the second user re-allocates a fraction of the consideration to the third user.

In yet another aspect, the method may include generating a reselling agreement between a first user and a second user of an event management server for the reservation of a ticket associated with the event. The method may also include generating a second user identification information on an availability notification of the ticket based on an approval of the reselling agreement. The method further includes tracing a purchase of the ticket by a third user to the second user based on the second user identification information on the availability notification. The method also includes automatically generating, through a payment portal, a consideration to the second user based on the reselling agreement when the purchase is complete.

The method may further include processing through the event management server, a request of the first user to publish a set of reservation details associated with the ticket. The method also includes configuring, through the event management server, a set of reselling options associated with the ticket based on a response of the first user. The method also includes allocating, through the event management server, the consideration to be generated to the second user when the purchase is complete.

The method also may include re-allocating a fraction of the consideration to the third user in the form of a discount based on a response of the second user. The method also includes automatically reducing the ticket price based on the re-allocation when the purchase is complete. The method also may include automatically generating a balance of the consideration to the second user based on the discount.

Further the method includes dynamically modifying the consideration based on at least one of a number of tickets sold through the second user and a number of tickets sold through the second user within a fixed period of time.

The methods and the systems disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

This disclosure relates to configuration and incentive management in an event management environment providing an automated segmentation of consideration. In the following description, for the purposes of explanation, numerous specific details are set forth in order to provide a thorough understanding of the various embodiments. It will be evident, however, to one skilled in the art that the various embodiments may be practiced without these specific details.

System Overview

The application discloses methods that center around reserving a ticket associated with an event through an event management center that approves and provides incentives for users to promote the reservation of the ticket. In one or more embodiments, a first user may be an organizer of an event and may be approved by the event management server to publish an event on the event management server. In another embodiment, a second user may enter into a reselling agreement with the first user to promote the event, and in return be promised a consideration based on at least one of a number of tickets sold, a ticket price of the ticket and a time period within which the ticket is sold. Upon approval by the first user, the event management server generates a second user identification information on an availability notification for the second user in one embodiment. In an embodiment, the second user may then publish the second user identification information on the availability notification on a social network profile or may use it in the form of a redemption code to promote the event to members of the social network. In another embodiment, a third user may be interested in the event as publicized in the social network of the second user, and may be directly to the event management server through the second user identification information. When the third user purchases the ticket for the event, a payment portal to which the payment is made automatically generates the promised consideration to the second user and the remainder of the ticket price to the first user, in one embodiment. Although the present embodiments have been described with reference to specific example embodiments, it will be evident that various modifications and changes may be made to these embodiments without departing from the broader spirit and scope of the various embodiments.

Figure 1:
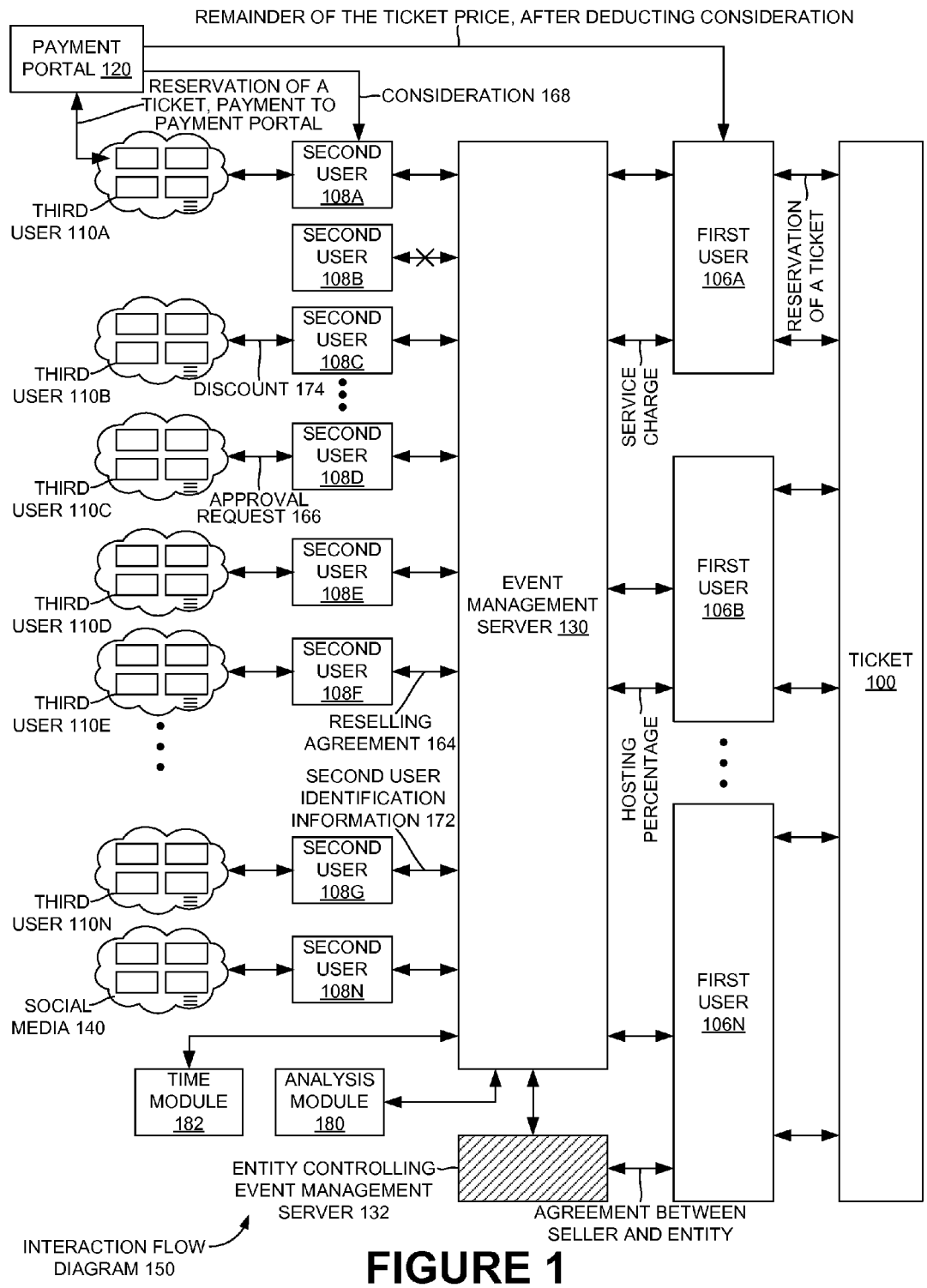
FIG. 1 illustrates an interaction flow overview of the event management system and the payment portal in relation to the various users of the system.

FIG. 1 describes the interaction between the first user 106, the event management server 130, the second user 108, the third user 110 and the payment portal 120. The first user may be a seller of a ticket associated with an event, an organizer of an event, a retailer, a party host, a host of a charity event, etc. and may want to advertise and publicize a ticket associated with an event. The first user may request the event management server 130 to publish a set of reselling options associated with the ticket in one or more embodiments. The set of reselling options may include a set of details associated with the event and the ticket. For example, the set of reselling options may include a time of the event, a place of the event, a number of tickets to be reserved, a promised consideration, a geographical preference of promoters, and other relevant details associated with the ticket. In an example embodiment, the first user may be interested in reserving a set of tickets associated with a charity event and may use the event management server to spread the word and reach out to a broader audience. To help promote the event, the first user in this case may specify a number of tickets to be sold and may promise a consideration of 10% of the price of the ticket for selling each ticket in one example.

In one or more embodiments, the event management server 130 may process the set of reselling options associated with the ticket in exchange for a hosting percentage or a service charge paid to an entity controlling the event management server 132. For example, the event management server may allow the first user to publish the set of reselling options in exchange for a lump sum of money per event that may be paid to the entity controlling the event management server 132. In another example, the entity controlling the event management server 132 may receive a monthly fee that may grant unlimited access to the event management server 130. In one or more embodiments, the event management server 130 may then publish the event to be accessible to a large number of users.

The second user 108 may view the set of reservation details associated with the event and may be interested in promoting the reservation of the ticket associated with the event in one or more embodiments. The second user 108 may be a promoter of events and may want to earn a commission based on number of tickets reserved through him, in one example. The second user 108 may also be a person with a lot of contacts on his social network, and may want to publicize events to gain some extra case in another example. The first user 106 may configure the set of reselling options associated with the ticket 100 through the event management server 130. As mentioned above, the set of reselling options may include a time, place, and a number of tickets associated with the event in one or more embodiments.

The set of reselling options may also include the consideration promised to the second user 108, as an incentive to help reserve a large number of tickets. The first user 106 may allocate at least one of a service charge 160 and a hosting percentage 162 of a ticket price 170 to the entity controlling the event management server 132. The first user 106 may also allocate a consideration to the second user 108 when a ticket is purchased through the second user. The consideration to the second user 108 may be an affiliate percentage of the ticket price. As in the example above, the first user may promise a consideration of 10% of the ticket price for each ticket reserved through the second user. The consideration to the second user 108 may also be a fixed price to the second user. In another example embodiment, the first user may allocate a fixed price, say $1 for every ticket reserved through the first user. The set of reselling options may also have a conditional consideration clause, in one or more embodiments. In one or more embodiments, the consideration promised to the second user may be dependent on a number of tickets reserved through the second user. In another embodiment, the consideration promised to the second user may be dependent on a time period within which a number of tickets are reserved through the second user. For example, the first user may promise a consideration of 20% of the ticket price to the second user; however, the first user may stipulate that the consideration will only apply assuming the second user helps reserve a minimum of 10 tickets. In this embodiment, the second user has a high incentive to promote the event and help reserve at least 10 tickets. In another example embodiment, the first user may further stipulate that the second user may only receive the promised consideration of 20% if the second user helps reserve at least 10 tickets within a period of 24 hours. In this example embodiment, the second user receives no consideration at all if only 5 tickets are reserved through him, or if 10 tickets are not reserved within 24 hours. The consideration to the second user 108 may also be sliding scale consideration based on a number of tickets reserved through the second user and a period of time in which the tickets are reserved in one or more embodiments. For example, in one embodiment, as an incentive to reserve more tickets, the first user 106 may promise a higher consideration for a larger number of tickets reserved through the second user. In one or more embodiments, the first user 106 nay promise a higher consideration depending on a larger number of tickets reserved. The first user 106 may also promise a higher consideration depending on a shorter time period in which the tickets are reserved. In one or more example embodiments, the first user 106 may promise a consideration of 10% of the ticket price for the first 100 tickets reserved, a consideration of 20% for the next hundred tickets reserved and a consideration of 25% for a number of tickets above 200. In one or more embodiment, the event management server 130 may further contain a time module to keep track of a time period during which a certain number of tickets are reserved through a particular user. In another example embodiment, the first user 106 may promise a special consideration of 30% if at least 100 tickets are reserved within a period of 1 hour, and only a consideration of 10% for all tickets reserved after the first one hour. In one or more embodiments, the set of reselling options may also include a venue and geographical local of the event, a title of the event, a number of ticket available, a date of the event, a time of the event, a special guest of the event, a promised consideration of the event, and a set of other relevant details about the event. In one or more embodiments, the event management server 130 may publish the set of reselling options stipulated by the first user 106.

In one or more embodiments, the second user 108 may become a user of the event management server 130 by providing authentication proof as set by the entity controlling the event management server 132. For example, the entity controlling the event management server 132 may require membership in a social network such Facebook®, or some other social network in order to become a user of the event management server 130. In another example, the entity controlling the event management server 132 may require a paid membership to the event management server 130. In another example, the event management server 130 may authenticate all users indiscriminately depending on a preference of the entity controlling the event management server 132.

In one or more embodiments, once the second user 108 is able to become a member of the event management server, the second user 108 may be able to view the set of reselling options stipulated by the first user and other sets of reselling options stipulated by other users. The second user 108 may select the set of reselling options associated with the ticket 100, and may submit an approval request 166 to the first user 106. For example, the second user 108 may be more inclined to promote the event associated with the first user 106 because the second user may himself by interested in attending that particular event. In another example, the second user 108 may select another event based on a geographical criteria, the promised consideration, an interest of the second user and other such preferences of the second user 108.

In response to the approval request 166, the first user 106 may perform one of automatically approving the second user 108, manually approving the second user 108 and manually denying the second user 108 in one or more embodiments. In one or more embodiments, the first user may automatically enter into a reselling agreement 164 when the second user 108 selects the set of reselling options associated with the event initiated by the first user 106. For example, the first user 106 may want to maximize the number of second users or promoters who may publicize the event and the first user 106 may be primarily interested in selling a maximum number of tickets, and may not be concerned with who the second user 108 is. In one or more embodiments, the reselling agreement 164 between the first user and the second user 108 may be a contract between the first user 106 and the second user 108 where the first user 106 promises a certain consideration if a certain number of tickets are reserved through the second user 108. In another embodiment, the reselling agreement 164 may be a contract listing the terms of the agreement between the first user 106 and second user 108 including key terms such as consideration, offer and acceptance, a time period of validity an arbitration clause and other terms.

In one or more embodiments, in response to the approval request 166, the seller 106 may automatically approve the second user 108 based on an auto approval preference of the seller. For example, the first user 106 may not be interested in who the second user 108 is and may be willing to allow all users to help reserve the set of tickets associated with event. In another embodiment, in response to the approval request 166, the first user 106 may manually approve or manually deny the second user 108 based on one or more criteria. For example, the first user 106 may want to individually choose all users who may promote the event.

In one or more embodiments, the first user 106 may not want to publicly promote the event, and may want to only promote the event using certain preapproved users. For example, the first user 106 may screen all users that select the set of reselling options associated with the first user 106, and may only approve 10% of the users that may be interested in promoting the event. The first user 106 may approve or deny the second user 108 based on a set of criteria. The criteria may be one or more of interest criteria of the second user, prior history criteria of the second user, a ratings criteria of the second user, a reputation score criteria of the second user, a financial criteria of the second user, a geographical criteria of the second user and a temporal criteria of the second user. In one or more embodiments, an analysis module associated with the event management server 130 may process, analyze, store and display a set of statistics associated with all users of the event management server 130. For example, the analysis module may collect, store and analyze a set of activities associated with all users of the system. For example, the analysis module may track the activity of a particular user, and may track a number of tickets reserved through the particular user, and analyze the data. In another example, the analysis module may use an algorithm to rate all users of the system, based on a set of factors. The set of factors may include a success of reservation of tickets, a reliability of the user, a successful transferring of consideration upon completing a transaction, a rating of the user based on prior feedback, an expertise of the user, and other relevant factors. In one or more embodiments, the event management server 130 may give a high rating to a particular user based on a prior positive feedback to the particular user. In another example, the event management server 130 may show a prior history of the particular indicating that the particular user helped reserve more than 100 tickets. In one or more embodiments, the first user 106 may select the second user 108 based on a favorable criteria as analyzed by the analysis module associated with the event management server 130. In another example, the first user may have expressed an interest in promoting certain charity events, as analyzed by the analysis module, or by a stated preference of the second user 108. The first user 106 may be want to specifically approve the second user 108 based on his stated interest, in one or more embodiments.

When approved by the first user 106 and after the reselling agreement has been generated between the first user 106 and the second user 108, the event management server 130 may generate a second user identification information 172 an availability notification of the ticket 100 that is unique to the second user 108 in one or more embodiments. The second user identification information may be a unique URL, a unique web address, a redemption code unique to the second user and any other indicator that may trace the reservation of the ticket to the second user. In one or more embodiments, the event management server 130 may generate the second user identification code and place it on an availability notification of the ticket 100. For example, the availability notification may list some basic details about the event. In another example, the availability notification may be a printable advertisement of the event that the second user may distribute within friends or at a mall. The availability notification may carry the redemption code unique to the second user so that the second user may then receive the promised consideration. In another example, the second user 108 may then publish the availability notification carrying the second user identification information in the form of a unique URL such that a potential purchase of the ticket 100 may be traced to the second user 108.

In one or more embodiments, the second user 108 may publish the event on his social media 140 to promote the reservation of the ticket 100 to members in his social network or members of the social media 40. For example, as discussed above, the second user 108 may use the unique URL containing the availability notification of the ticket 100 and publish it on his Facebook® page. A third user 110, who may be friends with the second user 108 may click on the unique URL, and may be automatically directed to the event management server 130 in one or more embodiments. The event management server 130 may automatically recognize that the third user has been directed to the event management server 130 through the second user identification information 172 of the unique URL in one or more embodiments. If there is a purchase by the third user 110, the event management server will trace the purchase automatically to the second user 108 in one or more embodiments.

The third user 110 may view a set of more details associated with the event on the event management server 130 in one or more embodiments. The third user 110 may purchase the ticket 110 through the event management server 130 and pay the ticket price associated with the ticket to a payment portal 120 associated with the event management server 130 in one or more embodiments. In one or more embodiments, the payment portal may be a website that collects and distributes payment. For example, the event management server may use Paypal® as the payment portal.

In one or more embodiments, the second user identification information 172 may be a unique URL that the second user 108 may publish on a social media website (e.g., facebook.com, twitter.com, myspace.com, Friendster.com. blogging pages and other social networking pages). The third user 110 may be a friend of the second user 108 on the social network in one or more embodiments. The third user 110 may be an affiliate purchaser, or a purchaser affiliated with the second user 108. The third user 110 may be a contact of the second user 108 in one or more embodiments. The third user 110 may click on the unique URL, as published by the second user 108 and purchase the ticket 100. When a unique URL is present, the ticket 100 will automatically be traced to second user 108 through the unique URL. In one or more embodiments, the third user 110 may click on the second user identification information and may further purchase the ticket. The third user 110 may then be directed to the payment portal 120 at the time of purchase in one or more embodiments. In one or more embodiments, the payment portal 120 may automatically split the payment such that the consideration is automatically deposited into an account associated with the second user 108, and the remainder of the ticket after deducting the consideration may be automatically deposited into an account associated with the first user 106. In one or more embodiments, both the first user 106 and the second user 108 may establish accounts with the payment portal 120 prior to promoting the event. For example, the event management server 130 may direct the second user and the first user to Paypal® to set up an account with the payment portal 120 prior to generating the second user identification information.

In another embodiment, the second user identification information 172 may be a redemption code that the second user 108 may print on a computer and distribute to a social network (e.g., promotional mails, personal mails, paper advertising, and personal advertising). The third user 110 may purchase the ticket 100 and may mail the redemption code to the first user 106. When a redemption code is present, the ticket 100 will automatically be traced to the second user 108 through the redemption code.

In one or more embodiments, the second user 108 may re-allocate a fraction of the consideration to the third user in the form of a discount 174. In one or more embodiments, the discount 174 off the ticket price 168 may be automatically segmented concurrently and simultaneously (e.g., between the first user 106, the second user 108, and the third user 110 based on the reselling agreement 164) when a purchase of the ticket is confirmed through the event management server 130 and the payment portal 120. The discount 174 may be automatically applied to the third user 110, and the ticket price 168 may be automatically reduced based on the discount through the payment portal 120 in one or more embodiments.

For example, the second user 108 may, as an incentive to encourage a purchase by the third user 110, decide to split a consideration of $10, on a ticket price 170 of $100, with the third user 110. When the third user 110 purchases the ticket 100, a discount 174 of $5 is automatically generated to the third user 110 such that the ticket price is reduced to $95.

In another example, the second user 108, may decide to pass the entire consideration to the third user 110, and may allocate 100% of the consideration as a discount to the third user 110. In this case, when the third user 110 purchases the ticket 100, as mentioned in the previous example, a discount 174 of $10 is automatically generated to the affiliated purchaser such that the ticket price is reduced to $90.

In one or more embodiments, when the third user 110 purchases the ticket 100, the payment portal 120 may automatically distribute the consideration to the second user 108, and the remainder of the ticket price, after deducting the consideration 168, to the first user 106 simultaneously as soon as the purchase of the ticket by the third user 110 is completed.

For example, the first user 106 may allocate a consideration of 10% to the second user 108 on a ticket price 170 of $100. When the third user 110 purchases the ticket 100, the payment portal 120 automatically distributes $10 of the ticket price 170 to the second user 108 and $90 of the ticket price 170 to the first user 106, assuming that no discount 174 was allocated. [see FIG. 4]

In a similar example, the first user 106 may allocate a consideration of 10% to the second user 108 on a ticket price 170 of $100, and the second user 108 may allocate an additional discount of $5 to the third user 110. When the third user 110 purchases the ticket 100, the payment portal automatically generates a $5 discount of the ticket price 170 to the third user so that the third user 110 purchases the ticket for $95, and automatically distributes $5 to the second user 108 and $90 to the first user 106. [see FIG. 5]

Based on the purchase of the ticket 100, the first user 106 may reassess an updated set of reselling options on the event management server 130, and may approve or deny additional reselling agreements between the first user 106 and other users in one or more embodiments. For example, the first user 106 may find that the tickets associated with the event are being sold rapidly and then may decide to approve very few users to promote the event further.

Figure 2:
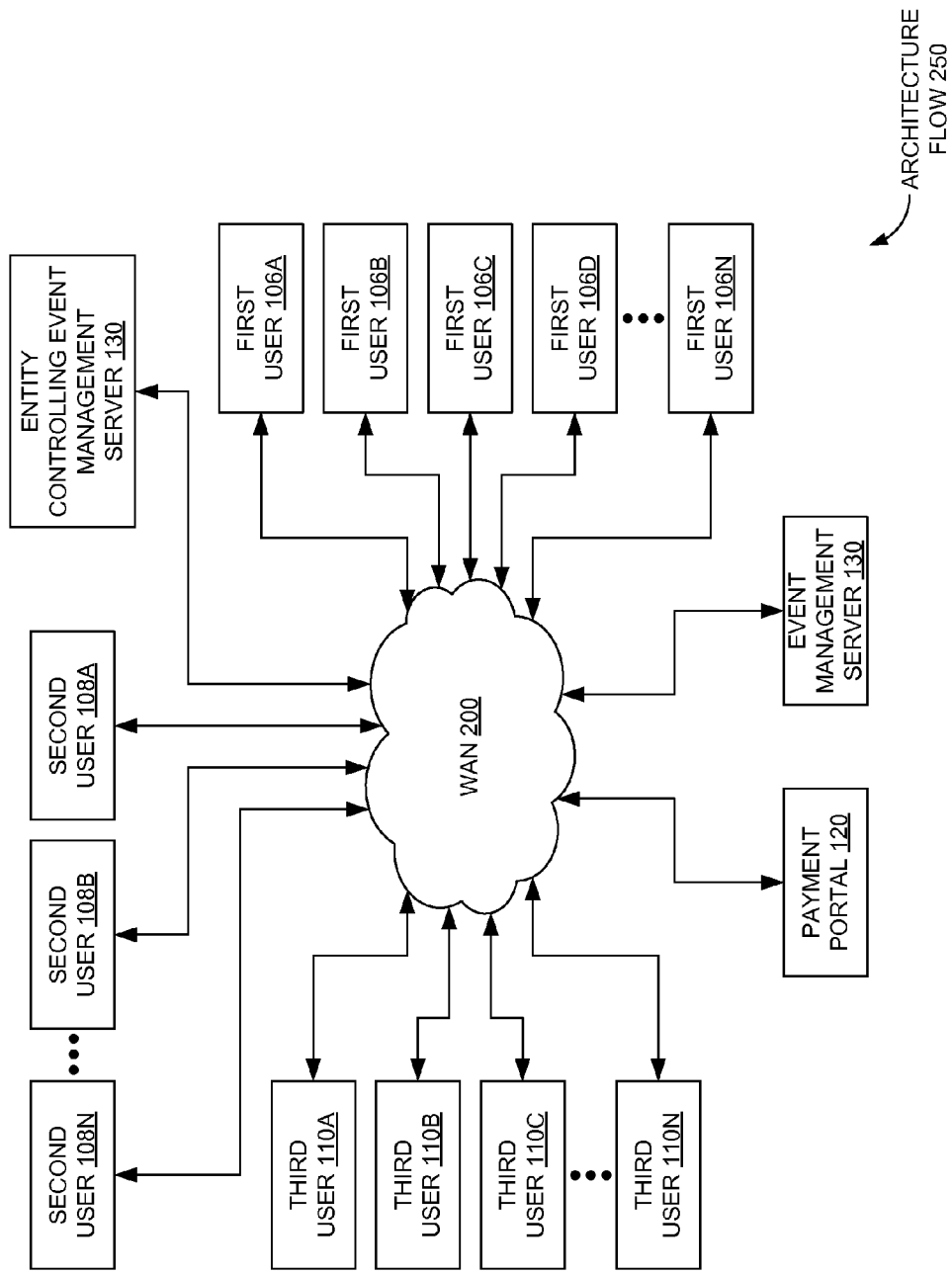
FIG. 2 is an architecture flow view of the network connecting the event management server and the payment portal to the users of the system.

FIG. 2 is a an architecture view that illustrates the method on a WAN 200 and illustrates the relationship between the first users 106, the entity controlling the event management server 132, the second users 108, the third users 110, the payment portal 120 and the event management server 130. The event management server 130 may operate on the WAN 200, and may permit the first user to configure a set of reselling options associated with the sale of the ticket 100. As illustrated in FIG. 1, second users 108 of the event management server 130 submit approval requests 166 to first users 106 through the WAN 200. Once approved by first users 106, as discussed previously, second users 108 may use the WAN 200 to locate third users 110. Similarly, third users 110 may purchase the ticket 100 on the WAN 200. The payment portal 120 generates an automatic split in the ticket price and may use the WAN to distribute funds to first users 106 and second users 108.

Figure 3A:
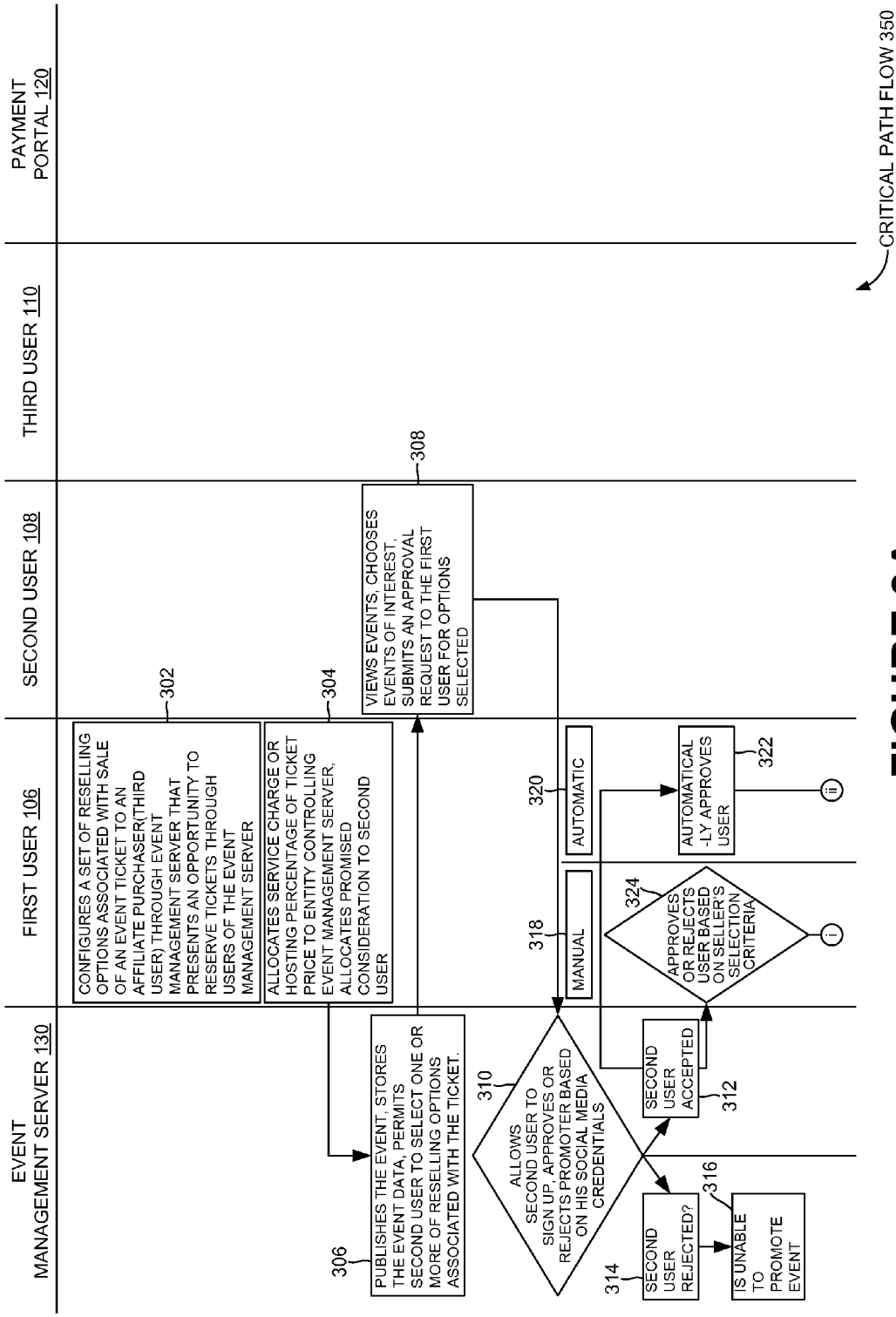
FIG. 3A is a critical path flow diagram illustrating the reservation of a ticket.

FIGS. 3A and B show a critical path flow that illustrates the method in a step by step approach.

In operation 302 starting in FIG. 3A, the first user 106 may configure a set of reselling options associated with the reservation of the ticket 100 based on a marketing request of the first user through the event management server 130 according to one or more embodiments.

In operation 304, the first user 106 may allocate the service charge 160 or the hosting percentage 162 to the entity controlling the event management server 132. The first user 106 may also allocate the consideration 168 to the second user according to one or more embodiments.

In operation 306, the event management server 130 may publish the set of reselling options associated with the reservation of the ticket 100. The event management server 130 may store the associated date and time and may permit second users 108 to select one of more of the reselling options associated with the ticket 100 according to one or more embodiments.

In operation 308, second users 108 may select and submit the approval request 166 for one or more of the reselling options associated with the ticket 100 according to one or more embodiments.

In operation 310, the event management server 130 may permit the second user 108 to submit the approval request 166 according to one or more embodiments.

In operation 312, the event management server 130 may permit the second user 108 to submit the approval request 166 according to one or more embodiments. For example, the event management server 130 may permit the second user 108A to sign up on the event management server as a result of proof that the user has a valid account on Facebook®.

In operation 314, the event management server 130 may deny the second user 108 to submit the approval request 166. For example, the event management server 130 may not allow the second user 108 to sign up on the event management server 130 as a result of no proof that the user 108B has a valid account on any social media network.

In operation 316, as a result of operation 314, the second user 108B may be unable to submit an approval request to the first user 106 according to one or more embodiments.

In operation 322, in response to the approval request 166, the first user may automatically approve the reselling agreement between the first user 106 and the second user 108A based on the automatic approval preference 320 of the first user 106 according to one or more embodiments.

In operation 324, in response to the approval request 166, the first user 106 may manually approve or deny the reselling agreement between the first user 106 and the second user 108A based on the manual approval preference 318 of the first user 106 according to one or more embodiments. For example, the first user 106 may approve the second user 108A on the basis of prior positive association with the second user 108A. The second user 108A may have successfully resold tickets for seller 106's other events at an earlier time. Similarly, the first user 106 may not approve the second user 108C on the basis on a geographical preference. For example, the first user 106 may be selling tickets in the San Francisco area, and may not want to users 108 of other geographical areas to resell the tickets.

Figure 3B:
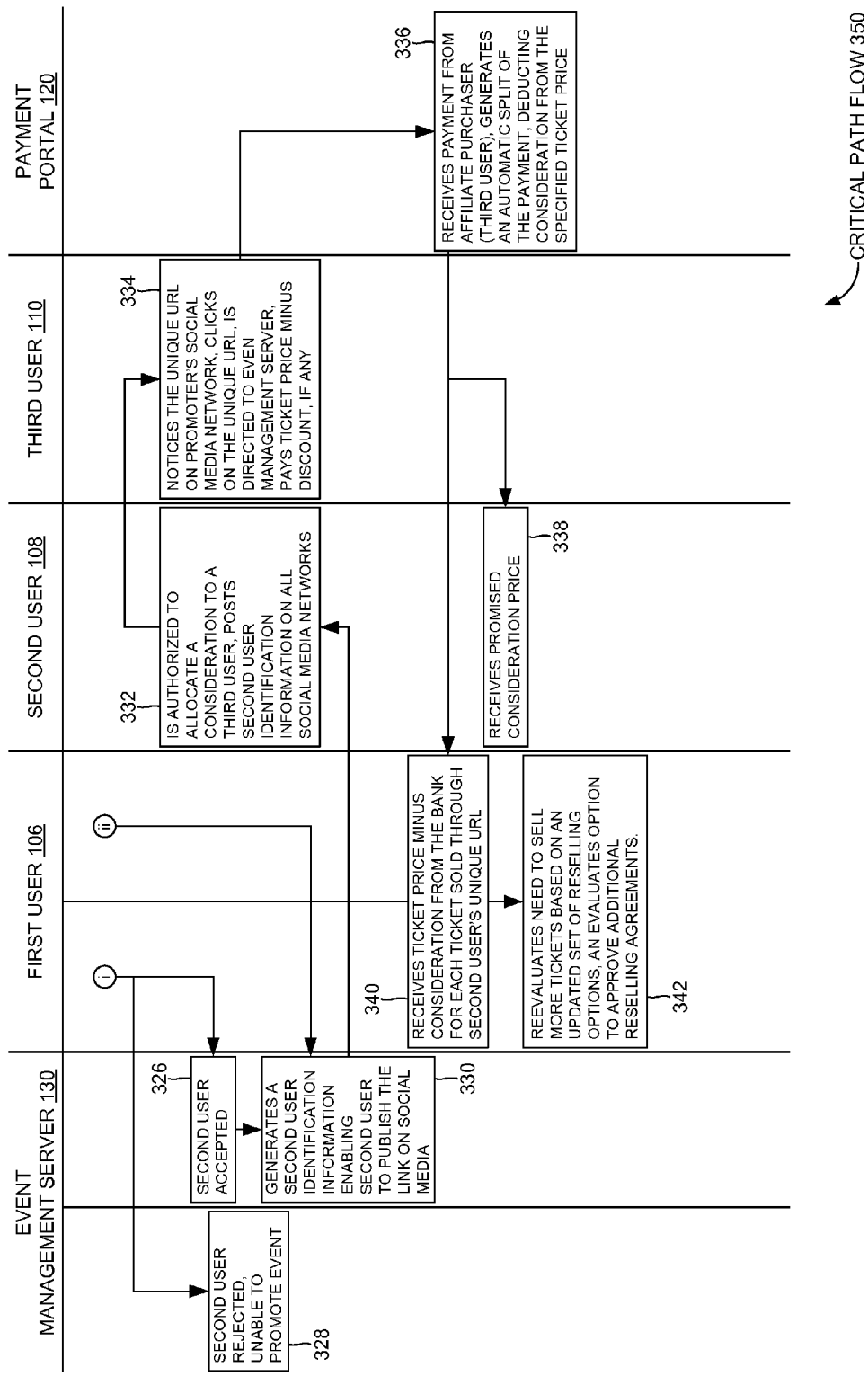
FIG. 3B is a continuation of the critical path flow diagram

In operation 326 (continued in FIG. 3B), the event management server 130 may notify the second user 108 concurrently when the first user 106 approves the reselling agreement between the first user 106 and the second user 108 in order to enable the user 108A to begin the process of reselling tickets according to one or more embodiments.

In operation 328, the event management server 130 may notify the second user 108B concurrently when the first user 106 does not approve the reselling agreement between the first user 106 and the second user 108B to preclude the second user 108B from reselling tickets according to one or more embodiments.

In operation 330, the event management server may generate a second user identification information 172 on a availability notification of the ticket to the second user 108A enabling the user 108A to publish the availability notification of the ticket and the second user identification information 172 on the social media of the second user 108A according to one or more embodiments.

In operation 332, as discussed previously, the second user 108 may allocate a discount to the third user 110 according to one or more embodiments. The second user 108A may publish the second user identification information 172 on various social media 140. As discussed previously, the social media could be, among others, a unique URL or a redemption code that the second user 108A may physically distribute to affiliated purchasers 110.

In operation 334, the third user 110 may purchase the ticket 100 following the second user identification information 172 and the availability notification of the ticket. For example, a third user 110A, may notice the unique URL on the "Facebook" page of the second user 108A, click on the URL, and purchase the ticket minus any discount allocated by the second user 108A. Because the third user 110A purchased the ticket through the unique URL of the second user 108A, the transaction may be automatically traced to the second user 108A.

In operation 336, the payment portal 120 may receive payment from the purchase of the ticket by the affiliated purchaser 110 and may generate an automatic split of the payment generating the consideration to the second user 108 and the remainder of the ticket price to the first user 106 according to one or more embodiments. For example, if the affiliated percentage was allocated as 30% by the first user 106, and no discount was allocated by the second user 108A, the payment portal automatically splits a ticket price 170 of $100 such that $30 is automatically deposited to the second user 108A, and $70 is deposited to the first user 106.

In operation 338, the second user 108A may receive the consideration 168 according to one or more embodiments.

In operation 340, the first user 106 may receive the remainder of the ticket price, after deducting the consideration 18 according to one or more embodiments.

In operation 342, the first user 106 may reevaluate the need to sell additional tickets based on an updated set of reselling options, and accordingly may approve additional reselling agreements as necessary according to one or more embodiments. For example, if a seller Brian (first user) has only sold 10% of the available tickets, he may conclude that he needs to approve more users than he had approved previously, to accelerate the sale of the tickets. Conversely, if Brian has sold 95% of the available tickets, he may approve few select-users based on his personal selection criteria.

Figure 4:
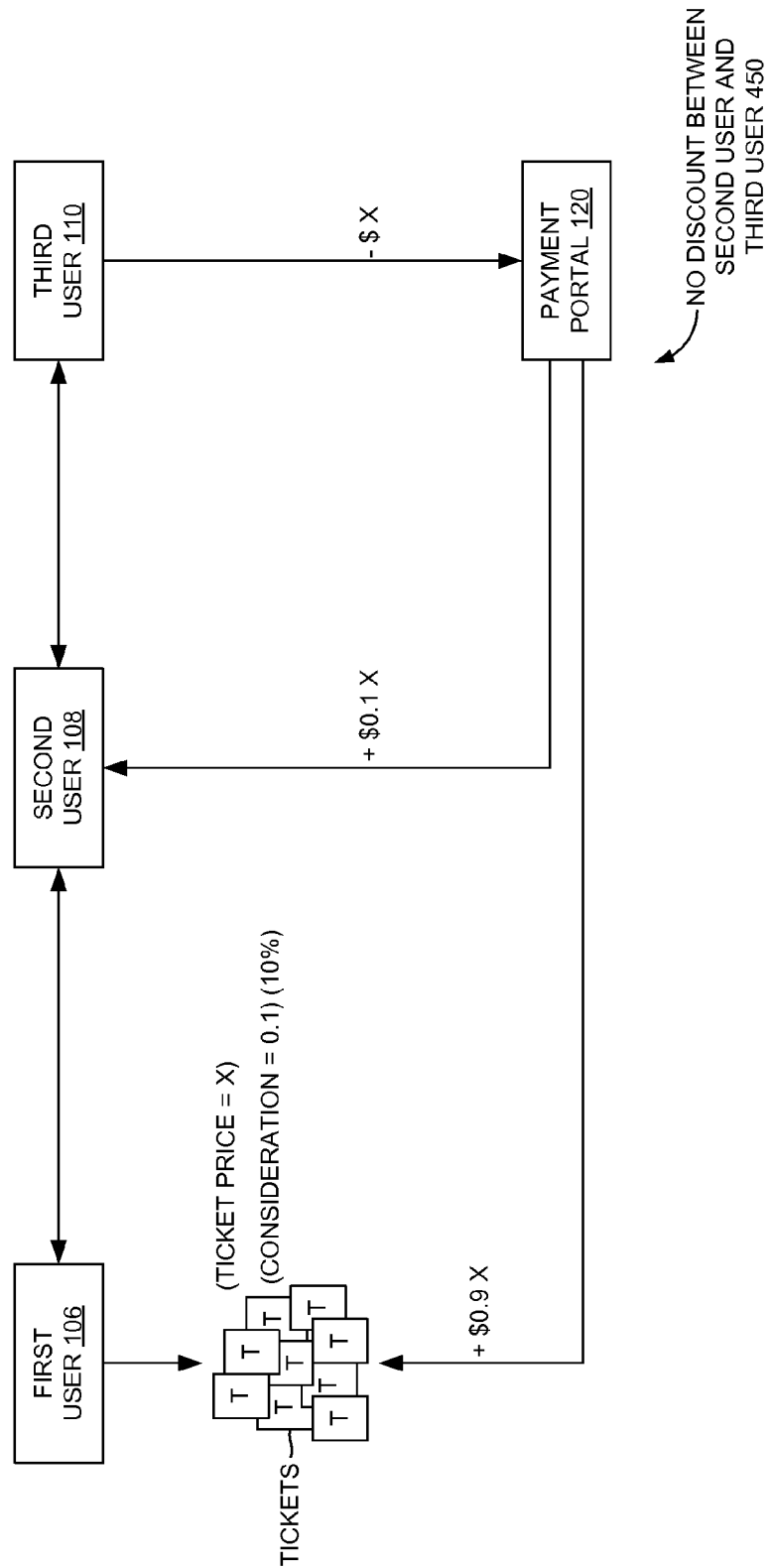
FIG. 4 illustrates a consideration generated to the second user and the remainder of the ticket price generated to the first user when a purchase of a ticket is complete.

FIG. 4 illustrates the process of payment between the first user 106, the second user 108 and the third user 110.

For example, as shown in FIG. 4 the first user 106 may allocate a consideration of 10% of the ticket price to the second user 108 on a ticket price of $X. When the third user 110 purchases the ticket, the payment portal 120 automatically distributes 10% of X to the second user 108 and 90% of X to the first user 106, assuming that no discount was allocated by the second user 108.

Figure 5:
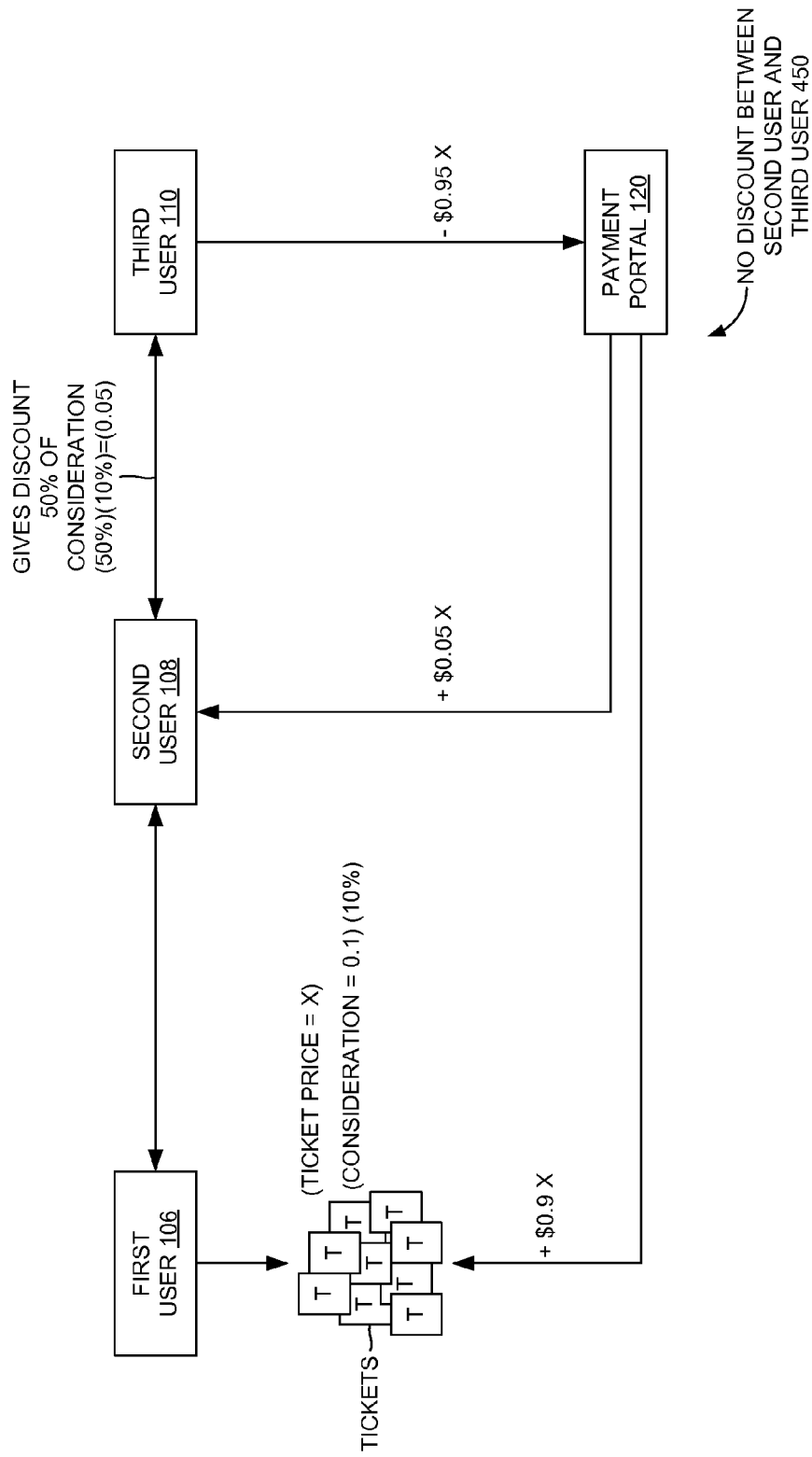
FIG. 5 illustrates a consideration generated to the second user and the remainder of the ticket price generated to the first user when the second user issues a discount to the third user.

FIG. 5 illustrates the process of payment when a discount is allocated between the second user 108 and the third user 110.

For example, as shown in the figure, a first user 106 may allocate a consideration of 10% to the second user 108 on a ticket price $X, and the second user 108 may allocate an additional discount of 50% of his consideration to the third user 110. When the third user 110 purchases the ticket, the payment portal automatically generates a 0.05X(50% of 10%) discount of the ticket price to the third user so that the third user 110 purchases the ticket for 95% of X, and automatically distributes 5% of X to the second user 108 and 90% of X to the first user 106.

Figure 6:
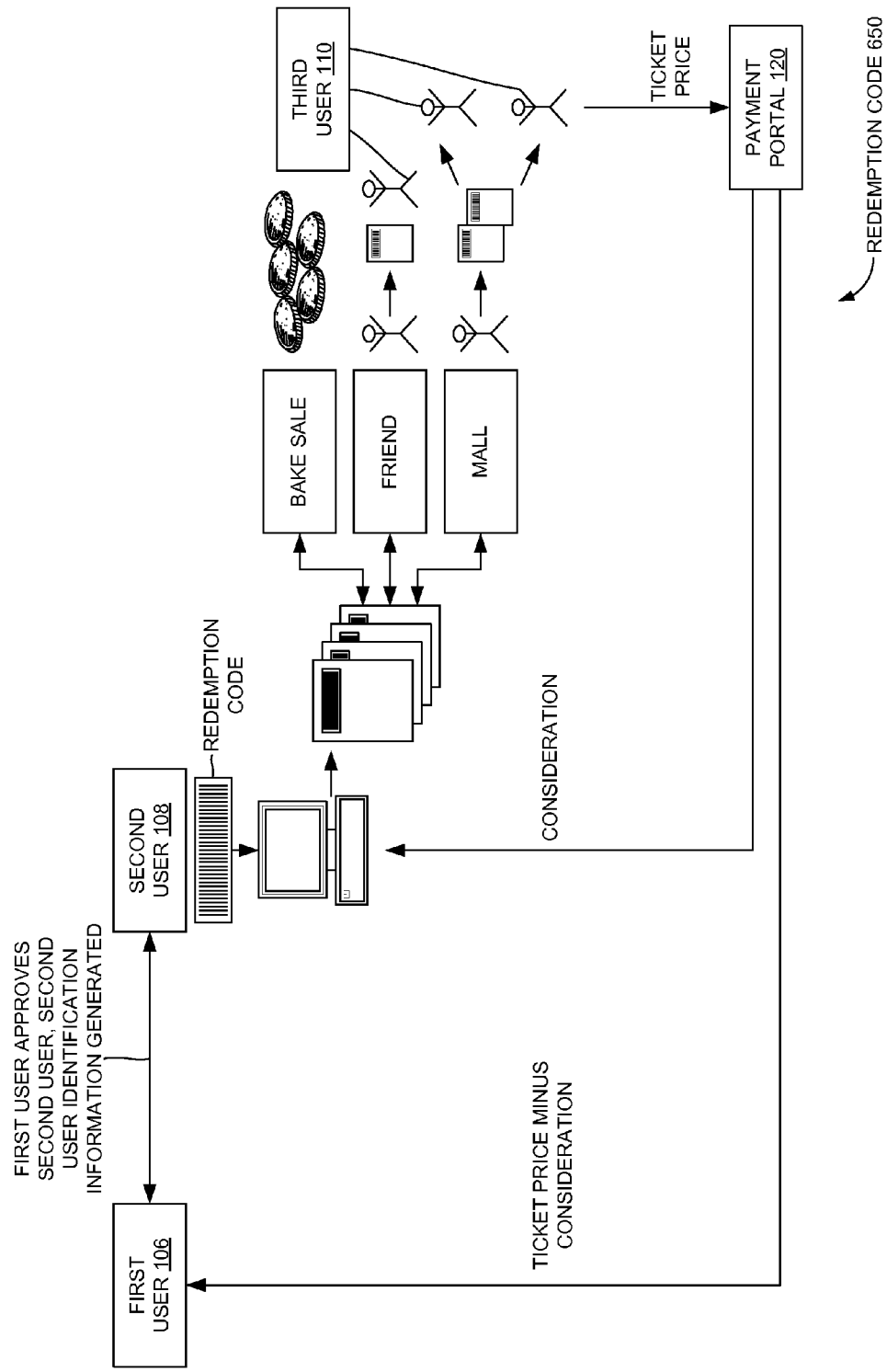
FIG. 6 illustrates the application of the system when the second user identification code on the availability notification of the ticket is used as a redemption code.

FIG. 6 illustrates an embodiment where the second user identification information 172 on the availability notification of the ticket may be a redemption code that the second user 108 prints on a computer and distributes to a social network (e.g., promotional mails, personal mails, paper advertising, and personal advertising). The third user 110 may receive the redemption code at a bake sale organized by a friend of the second user 108. The third user 110 may purchase the ticket 100 and mail the redemption code to the second user 106. The ticket 100 will automatically be traced to the second user 108 through the redemption code, and the payment portal will distribute the consideration to the second user 108 and the remainder to the first user 106.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software. For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
    processing, by a processor of an event management server, a publication request of a first user to publish a set of options associated with a ticket;
    approving, by the processor, a promotion request of a second user to promote a reservation of the ticket associated with an event;
    generating, by the processor, an identification information of the second user;
    placing the identification information on an availability notification of the ticket;
    publishing the availability notification of the ticket on at least one social network profile associated with the second user;
    reserving, by the processor, the ticket when a third user responding to the availability notification provides a payment to a payment portal of the event management server;
    automatically generating, by the processor, a consideration to the second user when the payment is complete, wherein the consideration is based on an agreement between the first user and the second user recorded by the event management server; and
    automatically determining, by the processor, an availability of a remainder of tickets based on a number of reserved tickets.

2. The method of claim 1 further comprising:
    configuring, by the processor, the set of options associated with the ticket;
    allocating, by the processor, at least one of a service charge and a hosting percentage of a ticket price to an entity controlling the event management server.

3. The method of claim 1, wherein the set of options is at least one of a number of tickets, the consideration allocated to the second user, a number restriction on a number of tickets to be sold by the second user, a time restriction on a time allotted to the second user for a sale of the ticket, a quantity consideration based on a number of tickets sold by the second user, a time consideration based on a period of time in which the second user sells a number of tickets, and a sliding scale model of how a number of tickets sold by the second user in a given period of time.

4. The method of claim 1, wherein the consideration to the second user is at least one of an affiliate percentage of a ticket price, a sliding scale affiliate percentage based on a ticket price and a number of tickets reserved, and a fixed amount based on a number of tickets reserved.

5. The method of claim 1 further comprising:
    authorizing, by the processor, the second user to access the event management server;
    selecting, by a response of the second user, at least one of the set of options associated with the ticket;
    generating, by the processor, the agreement between the first user and the second user based on the set of options; and
    submitting, by the processor, the promotion request of the agreement to the first user.

6. The method of claim 1, wherein the approving is at least one of a manual approval by the first user and an automatic approval.

7. The method of claim 6, wherein the manual approval by the first user is based on at least one of an interest criteria of the second user, a prior history criteria of the second user, a ratings criteria of the second user, a reputation score criteria of the second user, a temporal criteria of the second user, a seasonal criteria of the second user, and a geographical criteria of the second user.

8. The method of claim 1, wherein the identification information is at least one of a unique URL, a unique web source, a redemption code, and a unique bar code.

9. The method of claim 1 further comprising:
    tracing a purchase of the ticket to the identification information of the second user.

10. The method of claim 1 further comprising:
    re-allocating, by the processor, a fraction of the consideration to the third user as a discount offered on a ticket price;
    automatically reducing by the processor, the ticket price based on the discount; and
    automatically generating by the processor, a balance of the consideration to the second user based on the discount.

11. The method of claim 1 further comprising:
    dynamically updating, by the processor, the set of options based on a current state of ticket reservations; and
    approving, by the processor, a set of future agreements based on the current state of ticket reservations.

12. The method of claim 1 further comprising:
    dynamically modifying, by the processor, the consideration based on at least one of: a number of tickets sold through the second user and a number of tickets sold through the second user within a fixed period of time.

* * * * *